(12) United States Patent
Joseph et al.

(10) Patent No.: US 9,109,120 B2
(45) Date of Patent: Aug. 18, 2015

(54) PROCESS FOR ISOLATION AND PURIFICATION OF CAROTENOIDS

(75) Inventors: Suresh Joseph, Tamil Nadu (IN); Arnaud Anandane, Puducherry (IN)

(73) Assignee: DYNADIS BIOTECH INDIA PRIVATE LIMITED, Puducherry (IN)

( * ) Notice: Subject to any disclaimer, the term of this patent is extended or adjusted under 35 U.S.C. 154(b) by 118 days.

(21) Appl. No.: 13/698,247

(22) PCT Filed: May 16, 2011

(86) PCT No.: PCT/IN2011/000342
§ 371 (c)(1),
(2), (4) Date: Nov. 15, 2012

(87) PCT Pub. No.: WO2011/145112
PCT Pub. Date: Nov. 24, 2011

(65) Prior Publication Data
US 2013/0066117 A1    Mar. 14, 2013

(30) Foreign Application Priority Data

May 17, 2010    (IN) ............................ 1379/CHE/2010

(51) Int. Cl.
C07C 51/42    (2006.01)
C09B 61/00    (2006.01)

(52) U.S. Cl.
CPC ..................... C09B 61/00 (2013.01)

(58) Field of Classification Search
USPC .................................. 568/367, 816; 426/262
See application file for complete search history.

(56) References Cited

U.S. PATENT DOCUMENTS

| | | | |
|---|---|---|---|
| 4,316,917 A * | 2/1982 | Antoshkiw et al. | ........... 426/540 |
| 5,648,564 A | 7/1997 | Ausich et al. | |
| 5,847,238 A | 12/1998 | Muralidhara et al. | |
| 5,858,700 A | 1/1999 | Ausich et al. | |
| 6,262,284 B1 | 7/2001 | Khachik | |
| 6,329,557 B1 | 12/2001 | Rodriguez et al. | |
| 6,376,722 B1 | 4/2002 | Sanz et al. | |
| 6,380,442 B1 | 4/2002 | Madhavi et al. | |
| 6,504,067 B1 | 1/2003 | Montoya-Olvera et al. | |
| 6,743,953 B2 | 6/2004 | Kumar T. K. | |
| 6,797,303 B2 | 9/2004 | Zelkha et al. | |
| 7,102,019 B2 * | 9/2006 | Streicher et al. | ............. 549/315 |
| 7,138,152 B2 | 11/2006 | Allen et al. | |
| 7,173,145 B2 | 2/2007 | Khachik | |
| 7,179,930 B2 | 2/2007 | Bhaskaran et al. | |
| 7,232,560 B2 * | 6/2007 | Tsuchiya et al. | ................ 424/59 |
| 7,253,294 B2 | 8/2007 | Hoffman et al. | |
| 7,271,298 B2 | 9/2007 | Xu et al. | |
| 7,485,738 B2 | 2/2009 | Xu | |
| 7,622,599 B2 | 11/2009 | Swaminathan et al. | |
| 7,629,007 B2 | 12/2009 | Pena | |
| 7,812,198 B2 | 10/2010 | Eidenberger | |
| 7,875,751 B2 | 1/2011 | Chuang | |
| 2005/0139145 A1 | 6/2005 | Quesnel | |
| 2010/0280286 A1 | 11/2010 | Khachik | |
| 2010/0305366 A1 | 12/2010 | Liu | |
| 2011/0065965 A1 | 3/2011 | Mehta | |
| 2013/0066124 A1 | 3/2013 | Joseph et al. | |

FOREIGN PATENT DOCUMENTS

EP    2174559 A1    4/2010

* cited by examiner

*Primary Examiner* — Sudhakar Katakam
*Assistant Examiner* — Pancham Bakshi
(74) *Attorney, Agent, or Firm* — Nevrivy Patent Law Group P.L.L.C.

(57) ABSTRACT

The present invention discloses a novel saponification process for the isolation and purification of highly pure carotenoids from different carotenoid rich oleoresin derived from plants and microorganisms without the use of toxic chemicals and hazardous solvents. The hydrolysis is carried out by treating the carotenoid rich oleoresin with a novel mixture of a Fatty alcohol, alkali and a fatty acid without the use of any other solvents. Further the invention explains a process of stabilizing the carotenoids from getting degraded due to high temperature and exposure time during the saponification process. Further the invention discloses an economically viable process of isolating high pure carotenoids with higher yield.

20 Claims, No Drawings

PROCESS FOR ISOLATION AND PURIFICATION OF CAROTENOIDS

FIELD OF THE INVENTION

The present invention relates to isolation and purification of carotenoid crystals derived from various plant sources. The invention particularly relates to a novel saponification process for the isolation and purification of carotenoids from different carotenoid rich oleoresin derived from plants and microorganisms

BACKGROUND OF THE INVENTION

Carotenoids belongs the most widespread groups of naturally occurring pigments called as tetraterpenoids. These compounds are largely responsible for the red, yellow, and orange color of fruits and vegetables, and are also found in many dark green vegetables apart from higher plants these carotenoids are also present in certain type of algae, fungus and bacteria.

The most abundant carotenoids available through various food sources for human consumption are beta-carotene, alpha-carotene, gamma-carotene, lycopene, lutein, Zeaxanthin, beta-crpytoxanthin, and astaxanthin.

Beta-carotene, alpha-carotene, and beta-cryptoxanthin are significantly present in the orange-colored fruits and vegetables like mango, peach, apricot, and carrots. Green leafy vegetables like spinach, kale also contains beta-carotene, lutein and zeaxanthin. Lycopene is found in tomatoes, watermelons, pink guava, and grapefruit. Salmon, shellfish and egg yolks also reported to contains carotenoids. Micro-algae like *Dunaliella* Sp and *Haematococcus* sp are rich in beta-carotene and astaxanthin respectively, similarly there are wide range of micro organisms are capable of providing good commercial source for Natural carotenoids.

In recent days these natural carotenoids have gained significant important as a natural functional ingredient in Nutraceutical, food, cosmaceuticals and animal feed industries. Various studies shows that these carotenoids having a potential therapeutic property and as a potential use as natural coloring substances.

The increasing public health awareness and the strict health regulatory guidelines demands Natural, safe and healthier ingredients for various markets and applications hence there is a need for a environmentally safer, green technology and potential less health hazard compounds in the manufacturing of these natural products.

Our innovation answers these requirements in a way of providing highly concentrated natural carotenoids made without use of hazardous toxic organic solvents in the process.

Saponification or Hydrolysis is the state of art known and followed in the natural pigment or phyto-chemical industries for several years. Saponification is being carried out in order to break and liberates the fatty acid attached to the active molecules one of the typical example, the fatty acids diesters of lutein and zeaxanthin are naturally present in the oleoresin of marigold flower where hydrolysis is conducted to liberate the free form of carotenoids, another example is Lycopene extracted from tomato oleoresin, yet another example is capsanthin derived from the oleoresine of capsicul annum, similarly there are several example can be give for this process.

Thus the saponification or hydrolysis involves various methods including an aqueous strong alkali at different temperature in the presence of a surfactant or emulsifier or in an organic solvent strong alkali media or in an alcoholic alkali media or using hydrocarbons medium. In general the carotenoids are non soluble component in the hydrolysis media which gets crystallized and separated from the medium.

U.S. Pat. No. 7,875,751 discloses a method for the purification of carotenoids from plant extracts by saponification and purification, the saponification is done by using a polar solvent like methanol, ethanol and propan-2-ol and a non polar solvent like hexane, pentane and heptanes in the presence of an alkali, further the recovered crystals after drying are purified by re-crystallization under the presence of a water soluble solvent and deionized water. The process is highly complicated which involves different organic solvents & multiple steps for the purification U.S. Pat. No. 7,812,198 discloses a Process for the manufacture of a composition containing xanthophylls by saponifying a marigold flower extract and isolating the xanthophylls in the presence of a quaternary ammonium base.

U.S. Pat. No. 7,629,007 describes a process for purification of free xanthophylls, according to this disclosure a xanthophylls-containing plant-derived oleoresin is saponified using alkali, then the saponified oleoresin is washed with a salt solution for several times before treating with organic solvents for further purification finally the free xanthophylls are filtered and dried.

U.S. Pat. No. 7,622,599 Provides an isolation and purification method for carotenoids from marigold flowers by hydrolyzing marigold oleoresin using alcoholic alkali followed by precipitation of the carotenoid crystals using hydro alcohol mixture, further the crystals are washed to remove impurities, finally the crystals are filtered & dried. This patent uses numerous solvents that generate mixed solvent streams that are costly on a commercial scale to recover and separate.

U.S. Pat. No. 7,485,738 describes a method for preparing high-content food-grade zeaxanthin through chemical isomarizaton reaction from Lutein by treating Xanthophylls crystals with glycol or propylene glycol with organic alkali to carry out isomarization, further the zeaxanthin crystals are precipitated under deionized water and alcohol mixture to collect Zeaxanthin crystals.

U.S. Pat. No. 7,253,294 discloses a process for the Isolation of Lutein from alfalfa by saponifying green plant oleoresin to provide a saponified resin, which is treated with first volatile organic solvent to oily substance which is further treated with a second volatile organic solvent to derive the Lutein.

U.S. Pat. No. 7,271,298 describes a Process for isolation and purification of xanthophylls crystals from plant oleoresin, where the process involves saponification of plant oleoresin containing xanthophyll diesters with alcohol & alkali and neutralizing the mixture by adding an acid and further washing the mixture with water and alcohol to remove impurities to get Xanthyphylls crystals.

U.S. Pat. No. 7,179,930 discloses a method of preparing a stable Lutein paste from oleoresin by several steps such as dissolving oleoresin in a solvent and purification by resin, then saponification of the esters using a catalyst, treating in an acidic solution, separating the solids, drying the esters and distillation of the alcoholic fraction. Accordingly, the described method is not a commercially viable method in view of the large number of steps involved.

U.S. Pat. No. 7,173,145 describes a process for extraction and purification of lutein, zeaxanthin and rare carotenoids the method employs tetrahydrofuran and alcohol, preferably ethanol, as the extraction solvents. In our process we do not use any organic solvent for saponification.

U.S. Pat. No. 7,138,152 teaches a method for extracting carotenoids from fruit and vegetable processing waste, the method involves by admixing the carotenoids source material with a first organic solvent and a surfactant to form a slurry then adding a second organic solvent which solubilizes the combination then separated into a liquid fraction and a solid fraction and further separation is carried out. The process doesn't discuss about the pure form of crystals and fail to discuss the recovery percentage for the carotenoids.

U.S. Pat. No. 6,797,303 describes a Carotenoid extraction process by making plant matter to greater than 10.degree then treating the material with organic solvent to extract the carotenoids, the major disadvantage of the process is not high purity yield & crystal recovery is not disclosed further we do not use any of the said organic solvents for extraction.

U.S. Pat. No. 6,743,953 describes saponification process and final purification step involving multiple solvents like ethyl acetate, hexane, acetone and methanol with the possibilities of leaving residues of the same in the final products.

U.S. Pat. No. 6,504,067 describe a process for cleaning oleoresin with alkali and acid then the oleoresin is subjected to aqueous alkali saponification for 8 hours in the presence of emulsifiers at a temperature of 90° C. The major disadvantage is longer saponification time thus prolonged exposure to heat might cause the degradation of the Lutein.

U.S. Pat. No. 6,380,442 describes a saponification process for carotenoids by using Isopropyl alcohol, water and alkali.

U.S. Pat. No. 6,329,557 discloses an industrial process for obtaining xanthophyll crystals from marigold oleoresin. Large amounts of organic solvent such as hexane and ketone are used in the process U.S. Pat. No. 6,262,284 describes a method which uses THF (tetrahydrofuran) and alcoholic potassium or sodium hydroxide for isolating lutein and zeaxanthin by simultaneous extraction and saponification at room temperature.

U.S. Pat. No. 5,858,700 teaches a process for isolating and purifying lycopene crystals from a biological lycopene source by saponifying the source material using propylene glycol and aqueous alkali mixture to form lycopene crystals. The crystals are isolated and purified.

U.S. Pat. No. 5,847,238 describe a process for recovering xanthophylls from corn gluten by means of saponification and purifying the crude xanthophylls by methods of chromatographic separation. The method is difficult for industrial application, it will be quite expensive U.S. Pat. No. 5,648,564 teaches a method for the saponification of marigold oleoresin is made in an aqueous solution in the presence of alcohol and propylene glycol at the temperatures of up to 70° C. and 10 hours to complete the saponification further the crystallization made using an organic solvent to recover the crystals. The process is quite long and there is possibility of oxidation of the carotenoids due to prolonged exposure to heat.

U.S. Application No. 2005/0139145 discloses a relatively simple method of purifying carotenoids which include lutein using organic solvents.

U.S. Application No. 2010/0280286 discloses a process for the conversion of lutein or lutein esters to Beta and Alpha Cryptoxanthin by using catalytic hydrogenation.

U.S. Application No. 2010/0305366 describes a lutein Extraction Processes by first extracting lutein esters by organic solvent and ultra-sound method then saponifying the lutein ester containing filtrate using alkaline solution further the solution is washed and separated to collect the crude crystals then finally it is recrystalised using tetrafuran and deionized water.

U.S. Application No. 2011/0065965 describes a saponification process of marigold oleoresin using an alkane hydrocarbon alkanol solution and potassium hydroxide then crystals are collected and further the collected crystals are washed with methanol-hexane solution and finally the crystals are separated.

Though there are number of methods; a simplified, less to no use of organic chemical solvents, economical and industrially feasible method to isolate Carotenoids is the need of the hour.

OBJECT AND SUMMARY OF THE INVENTION

An Object of the invention is to provide a novel saponification process which helps in stabilizing and protecting carotenoids from degradation during the process of saponification.

Another object of the invention is to provide a cost effective and safe mixture of ingredients for the saponification process comprising of a Fatty alcohol, an alkali and a fatty acid without the use of any other toxic chemicals or any hazardous solvents.

Another object of the invention is to recover highly pure Carotenoid crystal, where as the purity is at least 90%.

Yet another object of the invention is to provide a high yielding process where the final Carotenoids yield is at least 90% from the initial stating material The present invention discloses a novel saponification process for the isolation and purification of highly pure carotenoids from different carotenoid rich oleoresin derived from plants and microorganisms without the use of toxic chemicals and hazardous solvents. The hydrolysis is carried out by treating the carotenoid rich oleoresin with a novel mixture of a Fatty alcohol, alkali and a fatty acid without the use of any other solvents. Further the invention explains a process of stabilising the carotenoids from getting degraded due to high temperature and exposure time during the saponification process. Further the invention discloses an economically viable process of isolating high pure carotenoids with higher yield.

The present invention discloses a production of Carotenoid crystals with a purity of at least 90% by a novel saponification reaction mixture process. The stability & efficiency of recovery of the crystal were increased by the addition of heat stable mixed short chain fatty acid, preferably caprylic capric acid in the reaction mixture.

DETAILED DESCRIPTION OF THE INVENTION

The heat stable caprylic capric acid stabilizes the carotenoids, to explain further a heat stable grade of caprylic capric acid used as a stabilizer in the saponification process which protects the carotenoids from degradation or loss when exposed at a higher temperature and reaction time during the saponification process, and this also helps to increase the overall yield of carotenoids. Thus the present invention overcomes the necessity for the use of Organic chemicals in the saponification process and the difficulty of stabilizing carotenoids during the saponification process which require high temperature and long reaction time.

The carotenoid stabilizer is of lower than 12.0% (w/w) of the saponification reaction mixture, preferably lower than 11.0% (w/w), more preferably lower than 10.0% (w/w), most preferably lower than 9.0% (w/w).

The process of the invention comprises the following steps:
(a) The oleoresin used in the process is from different sources from plants and Microorganisms. More preferably Carotenoid rich oleoresin derived from Plant sources like Marigold, Tomato, Palm, wolfberry, Pilli, Gac fruit, Adonis flowers and derived from microbial sources like yeast, fungi, algae and bacteria.

(b) The Oleoresin is loaded into reactor and homogenized vigorously for 5 to 10 min at a temperature of about 30° C. to 60° C., more preferably 35° C. to 55° C. and most preferably 40° C. to 52° C.

(c) The homogenized oleoresin is hydrolyzed in a reactor with addition of 0.5 to 1 volumes of 40-55% of aqueous potassium hydroxide solution, of the quantity of the oleoresin, To this reaction mixture 1 to 1.5 times of fatty alcohol is added and homogenized further, more preferably fatty alcohol like lauryl myristyl alcohol or pure form of lauryl alcohol or myristyl alcohol were used. To the above reaction mixture 3% to 10%, more preferably 4% to 9% and most preferably 4.1% to 9% of Caprylic capric acid is added, at a temperature ranging between 60° C. and 100° C. for a time period of 30 min to 90 min. The degree of saponification is evaluated by chromatographic techniques to ensure the completion of the process.

(d) The saponified reaction mixture is further cooled down to a temperature of about 30° C. to 60° C., more preferably 35° C. to 55° C. and most preferably 40° C. to 52° C. To the cooled reaction mixture 1 to 6 times, more preferably 1.5 to 4 times and most preferably 2 to 3 times of demineralized water is added and stirred for 5 to 20 min, more preferably 6 to 15 min and most preferably 8 to 12 min.

(e) To the cooled saponification reaction mixture, optionally alcohol like ethyl alcohol with low moisture content added about 2 to 10 times of the oleoresin content for crystallization of carotenoids and to remove the unwanted impurities like lipids and fats.

(f) The alcohol treated mixture is filtered through filter press by pumping the mass into the filtered press. The mass in the filter washed with warm water of 50° C. to 60° C. until the pH of the mass is till neutral.

(g) The wet mass from the filter-press is dried in warm water jacketed conical blender under vacuum at a temperature of 40° C. to 50° C. till the moisture and solvent impurities are below the permissible limit as per the pharmacopeia.

(h) The resulting crystals contains at least 90% of Carotenoids by UV-VIS spectrophotometer and the chemical recovery of the active in the end product is between 70% to 95% and the variable conditions thereof utilized based on the above process parameters by certain modification of the process and the reaction mixtures herein.

(i) The finished active carotenoids obtained are used for formulating formulations like, Oil, Cold water dispersible formulation, Beadlets, Granules, and powders with different concentrations depending upon the applications.

EXAMPLES

The following examples are just illustrative, but not limiting, of the methods of the present invention. Other adjustments or modification or adaptations of the variety of process or reaction conditions and ingredients or reagents normally encountered in phyto chemistry and which are obvious to those skilled in the art are within the spirit and scope of the invention.

Example 1

11.7 Gms of Lutein ester oleoresin with 135.1 gm/kg of Lutein ester content is taken 500 ml round bottomed flask, the oleoresin is homogenized for 5 to 10 min under stirring at a temperature of about 45 deg C. using hot water bath. Aqueous KOH [2.3 gms 95% KOH in 3.5 gms of water] is added to the homogenized oleoresin slowly. To this 1 gm of caprylic capric acid and 5 gms of lauryl alcohol were added and properly homogenized under stirring. The saponification reaction is carried out at a temperature of about 80 deg C. for 60 min. The saponification reaction is monitered by thin layer chromatographic run. Once the saponification reaction is completed, 25 gms of hot deminerized water is added to the mixture and stirred for 10 min. This diluted mixture is filtered under vacuum condition, during filtration, fresh hot deminerized water of about 100 gms were added continuously to the crystals to neutralize the crystals PH and to remove the unwanted impurities in the crystals. The wet crystals are then collected and dried under vacuum at a temperature of about 50 deg C. for an hour.

The carotenoid crystals recovered has a purity for the total carotenoids is about 92.43% by UV-VIS spectrophotometer analysis and the chemical recovery of the final product is 78.2%

Example 2

10 kg of Lutein ester oleoresin with 135.1 gm/kg of Lutein ester content is taken 50 liters capacity reactor with an agitator. The oleoresin is homogenized for 5 to 10 min under stirring at a temperature of about 45 deg C. using hot water in the jacket of the reactor as the heating medium. Aqueous KOH [1.95 kg 95% KOH in 3.0 kg of water] is added to the homogenized oleoresin slowly. To this 860 gms of caprylic capric acid and 4.3 kg of lauryl alcohol were added and properly homogenized under stirring. The saponification reaction is carried out at a temperature of about 80 deg C. for 60 min. The saponification reaction is monitered by thin layer chromatographic run. Once the saponification reaction is completed, 25.0 kg of hot deminerized water is added to the mixture and stirred for 10 min. This diluted mixture is centrifuged in high speed centrifuge to recover the crystals, during centrifugation, fresh hot deminerized water of about 100 kg were added continuously to the crystals to netralize the crystals PH and to remove the unwanted impurities in the crystals. The wet crystals are then collected and dryed under vacuum at a temperature of about 50 deg C. for an hour.

The carotenoid crystals recovered has a purity for the total carotenoids is about 91.75% by UV-VIS spectrophotometer analysis and the chemical recovery of the final product is 80.17%

Example 3

5 kg of Lutein ester oleoresin with 135.1 gm/kg of Lutein ester content is taken 50 liters capacity reactor with an agitator. The oleoresin is homogenized for 5 to 10 min under stirring at a temperature of about 45 deg C. using hot water in the jacket of the reactor as the heating medium. Aqueous KOH [0.975 kg 95% KOH in 1.5 kg of water] is added to the homogenized oleoresin slowly. To this 430 gms of caprylic capric acid and 2.15 kg of lauryl alcohol were added and properly homogenized under stirring. The saponification reaction is carried out at a temperature of about 80 deg C. for 60 min. The saponification reaction is monitered by thin layer chromatographic run. Once the saponification reaction is completed, 12.5 kg of ethyl alcohol is added to the mixture and stirred for 10 min. This diluted mixture is centrifuged in high speed centrifuge to recover the crystals, during centrifugation, fresh ethyl alcohol of about 50 kg were added continuously to the crystals to neutralize the crystals PH and to remove the unwanted impurities in the crystals. The wet crystals are then collected and dried under vacuum at a temperature of about 50 deg C. for an hour.

The carotenoid crystals recovered has a purity for the total carotenoids is about 93.59% by UV-VIS spectrophotometer analysis and the chemical recovery of the final product is 82.03%

REFERENCES

1. Agarwal S, Rao A V. Carotenoids and chronic diseases. Drug Metabolism Drug Interact 2000; 17(1-4):189-210 2000. PMID: 15130.
2. International Agency for Research on Cancer. IARC Handbooks of Cancer Prevention: Carotenoids. Lyon: International Agency for Research on Cancer; 1998.
3. Delgado-Vargas F, Jimenez A R, Paredes-Lopez O. Natural pigments: carotenoids, anthocyanins, and betalains—characteristics, biosynthesis, processing, and stability. Crit Rev Food Sci Nutr 2000 May: 40(3):173-289 2000. PMID: 15150.
4. Handelman G J. The evolving role of carotenoids in human biochemistry. Nutrition 2001 October: 17(10):818-22 2001. PMID: 15100.
5. Krinsky N I. Carotenoids as antioxidants. Nutrition 2001 October: 17(10):815-7 2001. PMID: 15110.
6. Young A J, Lowe G M. Antioxidant and prooxidant properties of carotenoids. Arch Biochem Biophys 2001 Jan. 1; 385(1):20-7 2001. PMID: 15120.

We claim:

1. A method for stabilizing and protecting heat degradable carotenoids during a process of saponification of carotenoid rich oleoresins, said method comprising the step of adding an effective amount of heat stable mixed short chain fatty acids to an oleoresin reaction mixture comprising the carotenoids.
2. The method of claim 1 wherein the carotenoids carotenoid rich oleoresin is from plant sources or microorganisms.
3. The method of claim 2 wherein the plant sources include Marigold, Tomato, Palm, wolfberry, Pilli, Adonis flowers and Gac fruit.
4. The method of claim 2 wherein the microbial sources include yeast, fungi, algae and bacteria.
5. The method of claim 1 wherein the mixed short chain fatty acids are capric and caprilyic acids.
6. The method of claim 1 wherein the effective amount of the mixed short chain fatty acids is selected from the group consisting of lower than 11.0% (w/w), lower than 10.0% (w/w), and lower than 9.0% (w/w).
7. A saponification method for protecting carotenoid rich oleoresins from degradation during the process of saponification comprising:
    a) homogenizing a carotenoid rich oleoresin;
    b) hydrolyzing and homogenizing the homogenized oleoresin in the presence of aqueous potassium hydroxide solution, fatty alcohol, and a mixture of caprylic capric acid;
    c) evaluating the degree of saponification to ensure completion of the saponification process;
    d) cooling the saponification mixture;
    e) adding to the cooled reaction mixture demineralized water;
    f) optionally adding alcohol to the cooled saponification mixture alcohol;
    g) filtering the water or alcohol treated mixture to create a filtered mass;
    h) washing the filtered mass; and
    e) drying the mass of h).
8. The saponification method of claim 7 wherein carotenoid rich oleoresins are derived from a source selected from the group consisting of Marigold, Tomato, Palm, wolfberry, Pilli, Gac fruit, Adonis flowers, yeast, fungi, algae and bacteria.
9. The saponification method of claim 7 wherein the fatty alcohol used is lauryl myristyl alcohol or pure form of lauryl alcohol or myristyl alcohol.
10. A method of saponification for the isolation of carotenoids from carotenoid rich oleoresin comprising incorporating fatty alcohol in a homogenizing oleoresin mixture comprising the carotenoid rich oleoresin.
11. The method of claim 10 wherein the fatty alcohol incorporated is selected from the group consisting of lauryl myristyl alcohol, pure form of lauryl alcohol, and myristyl alcohol.
12. The method of claim 7, wherein the caprylic capric acid is added in an amount selected from the group consisting of 3% to 10%, 4% to 9% and 4.1% to 9%, and at a temperature ranging between 60° C. and 100° C. for a time period of 30 min to 90 min.
13. The method of claim 7, wherein the temperature of a) is selected from the group consisting of about 30° C. to 60° C., 35° C. to 55° C. and 40° C. to 52° C.
14. The method of claim 7, wherein the evaluation of the degree of saponification of c) is by a chromatographic technique.
15. The method of claim 7, wherein the mixture of d) is cooled to a temperature selected from the group consisting of about 30° C. to 60° C., 35° C. to 55° C. and 40° C. to 52° C.
16. The method of claim 7, wherein mineralized water is added to the cooled reaction mixture in an amount selected from the group consisting of 1 to 6 times, 1.5 to 4 times and 2 to 3 times.
17. The method of claim 16, wherein the cooled reaction mixture is stirred after addition of the demineralized water for a length of time selected from the group consisting of 5 to 20 min, 6 to 15 min and 8 to 12 min.
18. The method of claim 7, wherein the alcohol is ethyl alcohol with low moisture content, in an amount of about 2 to 10 times of the oleoresin content for crystallization of carotenoids and to remove the unwanted impurities like lipids and fats.
19. The method of claim 7, wherein the washing of part h) is with warm water of 50° C. to 60° C. until the pH of the mass is neutral.
20. The method of claim 7, wherein the drying is in a warm water jacketed conical blender under vacuum at a temperature of 40° C. to 50° C.

* * * * *